United States Patent
Bockstaele et al.

(10) Patent No.: US 7,864,317 B2
(45) Date of Patent: Jan. 4, 2011

(54) COMPACT CATADIOPTRIC SPECTROMETER

(75) Inventors: Ronny Bockstaele, Merelbeke (BE); Bert Luyssaert, Ghent (BE); Kris Naessens, Melle (BE)

(73) Assignee: Trinean NV, Gentbrugge (BE)

( * ) Notice: Subject to any disclaimer, the term of this patent is extended or adjusted under 35 U.S.C. 154(b) by 163 days.

(21) Appl. No.: 12/374,247

(22) PCT Filed: Jul. 20, 2007

(86) PCT No.: PCT/BE2007/000083

§ 371 (c)(1), (2), (4) Date: Jan. 16, 2009

(87) PCT Pub. No.: WO2008/009074

PCT Pub. Date: Jan. 24, 2008

(65) Prior Publication Data

US 2009/0310135 A1    Dec. 17, 2009

Related U.S. Application Data

(60) Provisional application No. 60/837,799, filed on Aug. 11, 2006.

(30) Foreign Application Priority Data

Jul. 20, 2006    (EP) ................................. 06015122

(51) Int. Cl.
G01J 3/28 (2006.01)
(52) U.S. Cl. .................................................... 356/328
(58) Field of Classification Search ................ 356/328, 356/334; 385/37
See application file for complete search history.

(56) References Cited

U.S. PATENT DOCUMENTS

| | | | | |
|---|---|---|---|---|
| 4,838,645 A * | 6/1989 | Machler et al. | ................ | 385/37 |
| 4,852,079 A * | 7/1989 | Kinney et al. | ................ | 356/328 |
| 5,026,160 A * | 6/1991 | Dorain et al. | ................ | 356/328 |
| 5,754,290 A * | 5/1998 | Rajic et al. | ................ | 356/328 |
| 5,844,704 A * | 12/1998 | Song et al. | ................ | 385/37 |
| 6,081,331 A * | 6/2000 | Teichmann | ................ | 356/328 |
| 6,303,934 B1 | 10/2001 | Daly et al. | | |
| 6,862,092 B1 | 3/2005 | Ibsen et al. | | |
| 2002/0060792 A1* | 5/2002 | Ibsen et al. | ................ | 356/328 |
| 2005/0073680 A1 | 4/2005 | Chrisp et al. | | |
| 2006/0038994 A1 | 2/2006 | Chrisp et al. | | |
| 2006/0268269 A1* | 11/2006 | Warren | ................ | 356/328 |
| 2007/0252989 A1* | 11/2007 | Comstock | ................ | 356/328 |

FOREIGN PATENT DOCUMENTS

| | | |
|---|---|---|
| EP | 0 212 438 A2 | 3/1987 |
| WO | WO 00/40935 A | 7/2000 |

* cited by examiner

*Primary Examiner*—Kara E Geisel
(74) *Attorney, Agent, or Firm*—Bacon & Thomas, PLLC

(57) ABSTRACT

An optical characterisation system is described for characterising optical material. The system typically comprises a diffractive element (104), a detector (106) and an optical element (102). The optical element (102) thereby typically is adapted for receiving an illumination beam, which may be an illumination response of the material. The optical element (102) typically has a refractive surface for refractively collimating the illumination beam on the diffractive element (104) and a reflective surface for reflecting the diffracted illumination beam on the detector (106). The optical element (102) furthermore is adapted for cooperating with the diffractive element (104) and the detector (106) being positioned at a same side of the optical element (102) opposite to the receiving side for receiving the illumination beam.

14 Claims, 9 Drawing Sheets

COMPACT CATADIOPTRIC SPECTROMETER

TECHNICAL FIELD OF THE INVENTION

The present invention relates to the field of optical detection. More particularly, the present invention relates to methods and systems for optically characterising materials, e.g. using spectroscopic measurements.

BACKGROUND OF THE INVENTION

In a large number of today's applications, such as for example biotechnology applications or material characterisation, spectroscopy is used as a routine tool for performing absorbance and fluorescence and Raman measurements. For example in bio-sensing applications, molecular diagnostics or pharmacological applications, often a number of samples are processed in parallel, in order to increase the processing speed. An example of so-called high-throughput screening is the application of multi-well plates with a high number of sample reservoirs, ranging from 96 to 384 and even higher.

With the increasing number of wells in these plates, processing a whole plate in a serial way becomes too time-consuming and a parallel way of processing becomes necessary. The most obvious way to conduct a spectroscopic measurement on several samples simultaneously is to provide each sample with its own spectrometer. Even the smallest spectrometers available today will make such a setup rather large and difficult to assemble. Various samples can also be studied simultaneously by using hyperspectral imaging, in which, typically a one-dimensional image is transformed into a two-dimensional spectral image. When there is a minimal distance between two samples such a setup results in a poorly filled field of view of the hyperspectral imager and the hyperspectral imager must be dimensioned for the entire sample row, making the imager large.

In a classic Czerny-Turner configuration, typically one mirror is used to collimate light coming from an entrance slit and direct it towards the reflection grating. After diffraction, a second mirror is used to focus the light onto the detector or an exit slit. Sometimes both mirrors are combined into one mirror in which the configuration is also called an Ebert-Fastie configuration.

U.S. Pat. No. 6,862,092 B1 describes a system and method for measuring spectral information of light from at least one object. The system describes the use of a transparent body, whereby a light beam enters the transparent body and guides the diverging light beam via two mirror reflections on a diffractive optical element. The diffracted light beam then is reflected at an aspheric mirror surface and is directed to a detector element 34, allowing to detect spectral information. The transparent body typically has a complex, non-standard lens shape.

SUMMARY OF THE INVENTION

It is an object of the present invention to provide good apparatus or methods for optical characterisation of materials. It is furthermore an object of the present invention to provide components thereof, assisting in good optical characterisation of materials.

The above objective is accomplished by a method and device according to the present invention.

The present invention relates to an optical characterisation system for characterising material, the system comprising a diffractive element, a detector and an optical element, the optical element adapted for receiving at a first side of the optical element an illumination beam after interaction with the material to be characterised, the optical element having a refractive surface for refractively collimating the received illumination beam on the diffractive element and the optical element having a reflective surface for reflectively focussing the diffracted illumination beam on the detector, the diffractive element and the detector being at a same side of the optical element, opposite to said first side. The refractive surface and reflective surface may be positioned at the same side of the optical element. It is an advantage of such embodiments according to the present invention that a compact optical characterisation system can be obtained. It is furthermore an advantage of such embodiments according to the present invention that a compact system for spectroscopic measurements is obtained. It is an advantage of such embodiments according to the present invention that a system with limited manufacturing effort can be obtained. It is an advantage of such embodiments according to the present invention that the amount of stray light from light incident on the optical element and directly reaching the detector is limited, without putting a high burden on the manufacturing of the optical component. The refractive and the reflective surface may be different parts of the same curved surface of an optical element. The refractive surface may be a part of a curved surface of an optical element not comprising reflective material and the reflective surface may be a part of a curved surface of an optical element being made reflective, e.g. by coating with reflective material. It is an advantage according to the present invention that the optical element can be used in a configuration wherein the sample can be provided at an appropriate position from the optical element such that an efficient and sensitive system can be obtained. A surprisingly compact system being at the same time sensitive and readily easy to manufacture thus was obtained.

The optical element may be adapted for receiving a diverging illumination beam.

The diffractive element and the detector may be in contact with the optical component. It is an advantage of such embodiments according to the present invention that a system requiring limited manufacturing effort can be obtained. It furthermore is an advantage of such embodiments according to the present invention that the number of optical reflections in the system are low, resulting in less losses, and less stray light.

The receiving side of the diffractive element and the receiving side of the detector may be positioned in the same plane. It is an advantage of such embodiments according to the present invention that a rigid system can be obtained. It is an advantage of such embodiments according to the present invention that a relatively easy manufacturing is obtained. It is also an advantage that the outlining of components is made more easy as outlining only needs to be performed in two directions instead of three.

The optical element may be a catadioptric element. It is an advantage of such embodiments according to the present invention that the collimation and focusing can be done by a single optical element. It is an advantage of such embodiments according to the present invention that the number of optical elements needed is limited. It is furthermore an advantage of such embodiments according to the present invention that the optical element is a standard optical component. The collimation may be performed prior to the focusing. It is also an advantage of such embodiments according to the present invention that the number of components needed may be reduced compared to a classic Czerny-Turner configuration.

The optical element may be a partially coated plano-convex spherical lens element. It is an advantage of such embodiments that the single optical element may be made by partially coating a normal multi-purpose lens. The coating may be a reflective coating.

At least one of the refractive surface or the reflective surface may have a mirrored portion on the other surface, i.e. said reflective surface respectively refractive surface. The mirrored portion may be a mirror-symmetric portion. It is an advantage of embodiments of the present invention that a lens with a continuous lens surface can be used. The latter may allow the lens to be made using conventional lens manufacturing techniques, without the need for reshaping the optical element substantially, e.g. by removing part of the lens volume. The at least part of the refractive surface may comprise at least the surface actively used for refracting.

The optical characterisation system may be adapted for using an illumination beam having a continuous spectrum or quasi-continuous spectrum. It is an advantage of such embodiments according to the present invention that spectroscopic measurements may be performed, resulting in broad spectral information about the material to be characterised. The latter allows for example characterisation/detection of a plurality of elements in the material to be characterised.

Any of the diffractive element may be formed on a surface of the optical element. The detector may be positioned adjacent to the optical element. It is an advantage of such embodiments according to the present invention that a robust and/or shock-resistant system may be obtained. It is also an advantage of such embodiments according to the present invention that the accuracy of the systems may be improved, as the amount of positioning and alignment needed is reduced. In other words, the number of alignments between components that need to be taken care of may be reduced.

The number of reflections of an incident illumination beam in the optical element may be two or less. If interaction with the diffractive element is not counted as a reflection, the number of reflections of an incident illumination beam in the optical element may be one. The latter leads to a high resolution.

The optical element may be adapted such that an incident illumination beam is incident on the diffractive element under an angle, and wherein the detector is furthermore adapted for detecting a specular reflected zeroth order of the illumination beam. It is an advantage of such embodiments according to the present invention that detection of a specular reflected zeroth order of the illumination beam allows to use this zeroth order of the illumination beam for alignment or for postprocessing of the measured results, such as e.g. for taking the power of the illumination beam into account.

The optical characterisation system may be a multi-channel spectrometer. The optical characterisation system may be a multi-channel optical characterisation system adapted for characterising a plurality of samples in parallel, e.g. in different channels in the system.

The optical element may be a first plano-convex lens being at least partially translationally invariant in a first direction. It is an advantage of such embodiments according to the present invention that multiplexing may be performed with a compact system, i.e. that several samples can be measured simultaneously.

The diffractive element of the optical characterisation system may be a diffractive element common to different channels of the multi-channel optical characterisation system, e.g. spectrometer.

It is an advantage of such embodiments according to the present invention that the number of components used for the optical characterisation system may be limited.

The detector of the optical characterisation system may be a detector common to different channels of the multi-channel optical characterisation system, e.g. spectrometer. It is an advantage of such embodiments according to the present invention that the number of components used for the optical characterisation system may be limited.

The optical characterisation system may comprise a sample holder for positioning the sample at a distance from the optical element, the distance being between one time a radius of curvature of the refractive surface and four times a radius of curvature of the refractive surface.

The optical characterisation system furthermore may comprise, for each channel, a second plano-convex lens for focussing or collimating the illumination beam in the channel in the direction wherein the first plano-convex lens is translationally invariant.

The optical element may be adapted for receiving an illumination beam at a first side of the optical element, and the diffractive element and the detector are positioned at a single, second side of said optical element, the second side being opposite to the first side.

The present invention also relates to a method for optically characterising a material, the method comprising illuminating a material with an illumination beam thus generating an illumination response, thereafter, refracting at a first side of an optical element the illumination response from the sample into a collimated illumination response at an optical element, diffracting the collimated illumination response thus generating a diffracted illumination response, reflecting, at the optical element the diffracted illumination response thus generating a reflected illumination response, and detecting said reflected illumination response at a same side of the optical element as said diffracting the illumination response, the same side being opposite to said first side of the optical element.

The present invention furthermore relates to an optical element adapted for receiving at a first side of the optical element an illumination beam and adapted for being used with a diffractive element and a detector, the optical element having a refractive surface for refractively collimating the received illumination beam on a diffractive element and the optical element having a reflective surface for reflecting the collimated diffracted illumination beam, diffracted by the diffractive element, on a detector, said optical element being adapted for the diffractive element and the detector to be positioned at a same side of the optical element. The optical element may be adapted for receiving a diverging illumination beam and provide the further functionality as described above.

The optical element may be a catadioptric element.

The optical element may be a partially coated lens element.

The refractive surface and the reflective surface may be part of the same convex surface of the optical element. It is an advantage of embodiments of the present invention that a lens made with conventional lens manufacturing techniques can be used.

The optical element may be a plano-convex element.

The optical element may be adapted such that the number of reflections of an incident illumination beam, to be detected by a detector, in the optical element is two or less.

The optical element may be at least partially translationally invariant in a first direction.

The optical element may be a plano-convex cylindrical lens.

At least one of the refractive surface or the reflective surface may have a mirrored portion on the other surface, i.e. said reflective surface respectively refractive surface. The mirrored portion may be a mirror-symmetric portion. It is an advantage of embodiments of the present invention that a lens with a continuous lens surface can be used. The latter may allow the lens to be made using conventional lens manufacturing techniques, without the need for reshaping the optical element substantially, e.g. by removing part of the lens volume. The at least part of the refractive surface may comprise at least the surface actively used for refracting.

The present invention also relates to a computer-based method for designing an optical characterisation system for characterising material, the system comprising a diffractive element, a detector and an optical element, the optical element adapted for receiving an illumination beam after interaction with the material to be characterised, the optical element having a refractive surface for refractively collimating the received illumination beam on the diffractive element and the optical element having a reflective surface for reflectively focussing the diffracted illumination beam on the detector, the method comprising receiving parameters about the optical element and the diffractive element, for at least one relative position of the optical element with respect to the diffractive element, determining a position of a focus curve for an illumination beam focused by the optical element, and evaluating said position of said focus curve with respect to a position of a detector surface of the detector, positioned at a same side of the optical element as the diffractive element.

The invention also relates to a computer program product that, when executed on a computing means, is adapted for performing such a computer-based method for designing. It furthermore relates to a machine readable data storage device storing such a computer program product and transmission of such a computer program product over a local or wide area telecommunications network.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The teachings of the present invention permit the design of improved methods and apparatus for optical characterisation of materials, such as for bio-sensing or material characterisation.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
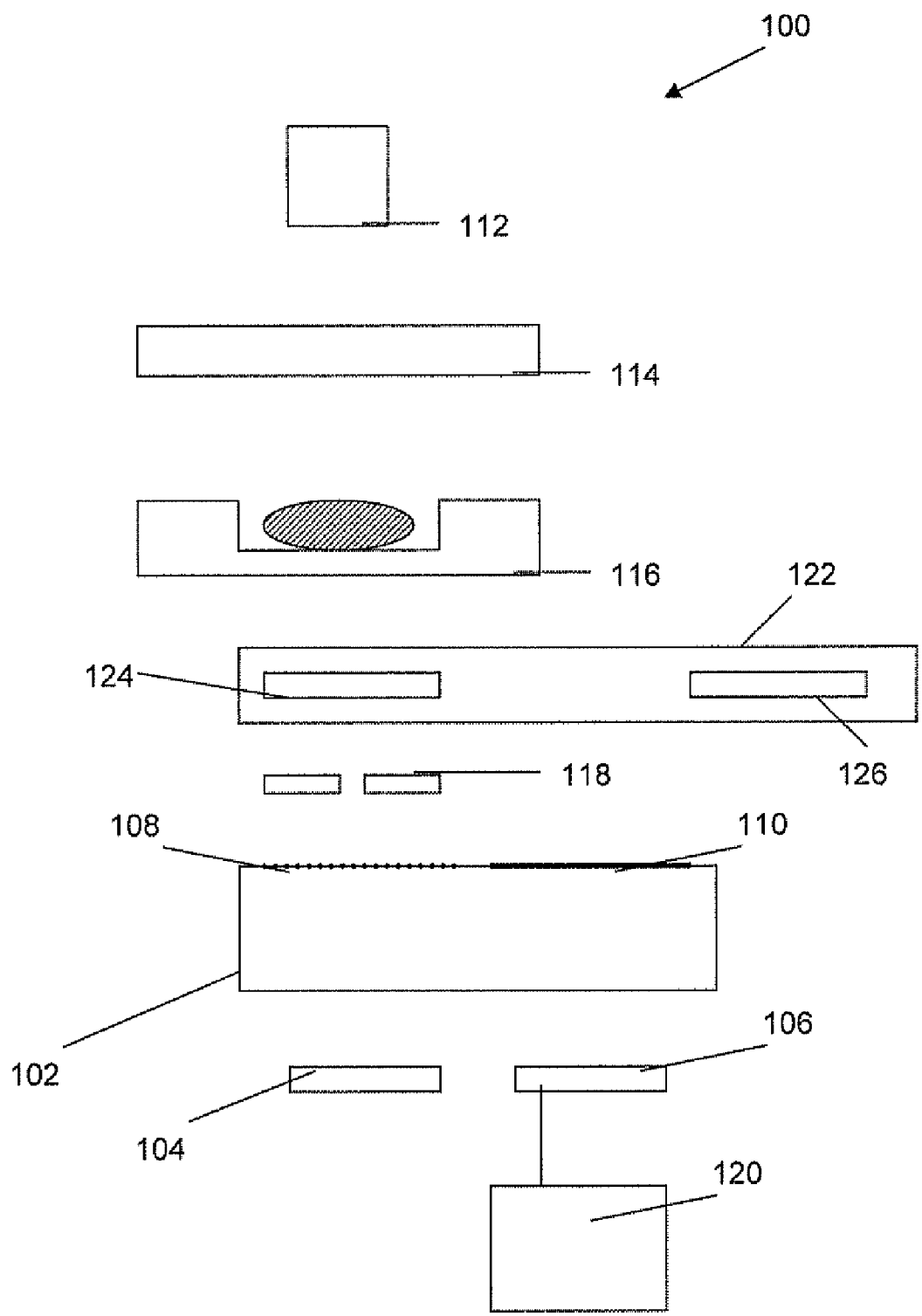
FIG. 1 is a schematic illustration of an optical characterisation system according to embodiments of a first aspect of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first and second and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the term under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

The following terms are provided solely to aid in the understanding of the invention. These definitions should not be construed to have a scope less than understood by a person of ordinary skill in the art.

The terms "optical" e.g. in optical system and "illumination" e.g. in illumination beam typically may refer to visual, infrared or ultraviolet radiation. Nevertheless, the present invention is not limited thereto and also relates to optical systems and components suitable for other types of electromagnetic radiation. The term "transparent" typically refers to a property of a construction material of a component expressing that an illumination beam is not substantially absorbed by the material, i.e. that preferably at least 50%, more preferably at least 80%, even more preferably at least 90%, still more preferably at least 95% of the illumination beam is transmitted through the component. With an illumination beam having a continuous or quasi-continuous spectrum there is meant an illumination beam comprising having wavelengths within a wavelength range of the electromagnetic radiation spectrum being substantially representative for that wavelength range. The wavelength range may span over at least 10 nm, more preferably over at least 50 nm, still more preferably over at least 200 nm, even more preferably over at least 500 nm.

Optical characterisation may comprise obtaining an "optical response" or "optical detection signal" from a sample material. The latter may be obtaining a transmitted or reflected portion of an illumination beam after interaction with the fluid sample, which for example allows to see a change in intensity and or spectral behaviour due to absorption by the fluid sample or particular analytes therein. Alternatively or in addition thereto, it may be obtaining a luminescence response, such as e.g. a fluorescence response, of a fluid sample or particular, optionally labelled, analytes therein as response to illumination of the sample fluid with the illumination beam. Labelling of analytes may be performed to detect presence of predetermined analytes by providing labels to these analytes, e.g. radiative labels or fluorescent labels although the invention is not limited thereto. Such labels may be attached to the analytes directly or indirectly.

Optical characterisation of the sample material may comprise optical characterisation of solids, gasses or fluid samples as such or characterisation of specific analytes present in such samples, such as e.g. proteins, antibodies, nucleic acids (e.g. DNR, RNA), peptides, oligo- or polysaccharides or sugars, small molecules, hormones, drugs, metabolites, cells or cell fractions, tissue fractions, specific chemical components, etc. The latter may be detected in an original sample fluid, or the sample fluid may already have been processed, such as filtered, dissolved into a buffer, chemically or biochemically modified, diluted, etc. The sample material may be e.g. biological fluids, environmental fluids, research fluids, fluids comprising solid sample material, solid material etc.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

In a first aspect, the present invention relates to an optical characterisation system for characterising material. Typically such a characterisation system may for example be used for material characterisation or as bio-sensor, the invention not being limited thereto. The optical characterisation system according to the first aspect comprises an optical element for receiving an illumination beam, whereby the illumination beam typically may have interacted with sample material to be studied. The illumination beam received in the optical element typically may be an illumination beam obtained after interaction with the sample material. It may be an illumination beam wherein part of the spectrum is at least partially absorbed or it may be a luminescence beam obtained after exciting the sample material with an original illumination beam. The optical characterisation system furthermore typically comprises a diffractive element and a detector for respectively diffracting different spectral components of the illumination beam differently and for detecting the illumination beam. According to the first aspect of the present invention, the optical element typically has a refractive surface for refractively collimating the illumination beam on the diffractive element and a reflective surface for reflecting the diffracted illumination beam on the detector. The diffractive element and the detector thereby typically are positioned at the same side of the optical element. The latter allows to obtain a compact optical system allowing to obtain spectroscopic information. Different standard and optional components of such a characterisation system are shown by way of illustration in FIG. 1, illustrating an exemplary optical characterisation system 100 according to an embodiment of the present invention.

The optical characterisation system 100 typically comprises an optical element 102 adapted for receiving an illumination beam, a diffractive element 104 and a detector 106. The optical element 102 typically may be substantially transparent for the illumination beam. It may be a plano-convex optical element. Typically, such an optical element 102 may be made from glass, silica, a polymer such as e.g. a plastic, etc. i.e. any suitable material allowing to obtain sufficient transparency. The optical element 102 typically may have a refractive surface 108 for refractively collimating the illumination beam on the diffractive element 104 and a reflective surface 110 for reflecting the diffracted illumination beam on the detector 106. The refractive surface 108 typically may be obtained by using a convex lens element, e.g. plano-convex lens element, for the optical element 102. Furthermore, also the reflective surface 110 may be obtained using the convex lens element. The refractive surface 180 and the reflective surface 110 may be part of the same convex surface of the optical element. The refractive surface or the reflective surface may be shaped such that a mirrored portion thereof coincides with at least a portion of the other surface, e.g. the reflective surface or refractive surface respectively. Such a mirrored portion also may be referred to as a mirror-symmetric portion. The refractive surface or the reflective surface may be mirrored surfaces of the optical element with respect to a mirror axis or mirror plane of the optical element. The optical element may comprise a symmetry axis such that the reflective surface is symmetric to the refractive surface with respect to the symmetry axis. The curved lens surface may be spherical or may be any other suitable shape. It may e.g. be a dedicated aspherical curved surface to achieve improved focussing of all wavelengths in the plane of the detector. The dedicated aspherical shape may e.g. be determined using optical modelling software, such as Zemax® available from Zemax Development Corporation, LightTools® available from Optical Research Associates, TracePro® available from Lambda Research Corporation or Advanced Systems Analysis Program ASAP™ available from Breault Research Organisation. The optical element 102 may be grinded, moulded or laser ablated, computer numerical controlled turned or replicated in any suitable way from a master form into a specific form.

As described above typically part of the curved surface of the convex, e.g. plano-convex, lens may act as refractive surface 108. For example, the optical element 102 may be a plano-convex spherical lens element wherein part of the spherical surface of the lens element acts as refractive surface 108 or it may be a plano-convex (partially) cylindrical lens element wherein part of the cylindrical surface of the lens element acts a refractive surface 108. The reflective surface 110 typically may be obtained by coating part of the optical element with a reflective material, such as e.g. with a reflective metal or with a reflective dielectric coating, e.g. a stack of thin films. Typically part of the curved surface of the plano-convex lens element may be coated with a reflective material. Preferably a high reflection coefficient is obtained for the wavelength range of the illumination beam, such as e.g. a reflectivity of 80%, preferably 90%, even more preferably 95%. Typically, in case the optical element is a plano-convex spherical lens or a plano-convex cylindrical lens, the partial coating of the optical element 102 may be a partial coating on a cylindrical surface or a spherical surface of the lens element. The optical element 102 thus may act as a catadioptric element performing both the action of refracting and reflecting. The optical element 102 may, e.g. in case a multi-channel optical characterisation system is envisaged, be an optical element 102 being at least partly translationally invariant in one direction, such as e.g. a plano-convex cylindrical lens element. The optical element 102 may, in case a multi-channel optical characterisation system is envisaged, be common to a plurality or all of the channels of the optical characterisation system. It is an advantage of embodiments of the present invention that the optical element can be made from a conventional or standard optical component, such as from a convex, e.g. plano-convex lens element, without the need for reshaping the optical element. The latter is advantageous to reduce the manufacturing effort and allows to increase the accuracy and/or to reduce the number of manufacturing errors than can be made as it avoids these additional processing steps. In other words, a normal multi-purpose lens may be used as optical element 102. The refractive surface 108 may allow to collimate impinging illumination and bring a collimated illumination beam on the diffractive element 104. The latter may allow to obtain a system wherein the distance between subsequent optical components such as the refractive surface 108, the diffractive element 104, the reflective surface 110 and the detector 106 corresponds with the focus distance for the refractive or reflective surface, thus resulting in an accurate system.

The diffractive element 104 typically may be a grating. Such a grating may be ruled or holographic. It may have a symmetric shape, e.g. a sinusoidal shape, a blazed shape, e.g. a saw-tooth profile or a shape in between those two forms. It may also comprise a stepped saw-tooth profile. The grating can e.g. be made in the bottom side of the optical element 102 or it may be a separate component. It may be covered with a reflection layer. The grating may e.g. be made using grooving ruling, e-beam lithography, ultraviolet lithography, focused ion beam, etc. If the diffractive element 104 is a separate element, it may be brought in direct contact with the optical element 102, e.g. by using an optically transparent, adhesive or in any other suitable way. Such an optically transparent adhesive may e.g. be an epoxy, a glue, a silicone compound etc. Preferably the adhesive may be an index matching material such that a optimal transition from the optical element 102 to the diffractive element 104 can be obtained. The latter nevertheless is no necessity as for a small refractive index difference the parasitic fresnel reflections typically can be small. Typically the diffracting element 104 may be positioned below a plane surface of the optical element 102, e.g. below the plane surface of a plano-convex optical element. Typically, the diffractive element 104 may be adapted such that the illumination beam is sufficiently diffracted to resolve different wavelengths of interest. The diffractive element 104 may e.g. also be an immersed grating, meaning that the substrate is transparent and that the grating is positioned on the bottom side of the substrate. The diffractive element may, in case a multi-channel optical characterisation system is envisaged, be common to a plurality or all of the channels of the optical characterisation system.

The detector 106 used typically may be adapted for detecting an optical detection signal from the fluid sample. The latter may be for example any of a transmitted illumination beam, a reflected illumination beam, a fluorescence signal in response to the illumination beam. The detector 106 typically may be adapted for detecting an illumination intensity. Such a detector 106 may e.g. be a photodetector, such as e.g. a photodiode or a pixelated detector. Typically, according to the first aspect of the present invention, the detection may be an area sensitive detector or a pixelated detector, allowing to detect a plurality of different optical signals at the same time, e.g. allowing to detect different spectral components at the same time. The optical characterisation system 100 may include a plurality of detector elements 106, or a 2D arrays of optical detector elements 106. The detector 106 may be integrated in the optical element 102 or it may be provided as a separate element. It may be provided in direct contact with the optical element 102 e.g. by using an optically transparent, adhesive or in any other suitable way. Such an optically transparent adhesive may e.g. be an epoxy, a glue, a silicone compound etc. Preferably the adhesive may be an index matching material such that a optimal transition from the optical element 102 to the detector 106 can be obtained. The latter nevertheless is no necessity as for a small refractive index difference the parasitic fresnel reflections typically can be small. The detector 106 may, in case a multi-channel optical characterisation system is envisaged, be common to a plurality or all of the channels of the optical characterisation system.

Typically, the optical element 102 is adapted for guiding the illumination beam received from the sample such that diffraction and detection is performed at the same side of the optical element 102. The diffractive element 104 and the detector 106 may be positioned against a surface of the optical element 102. They may be positioned in the same plane or the diffraction surface and detection surface may make an angle with respect to each other.

The optical characterisation system 100 furthermore typically may comprise an illumination source 112, a beam forming system 114 for focusing an illumination beam generated in the illumination source 112 to sample material, a sample holder 116 for holding the sample to be characterised and an aperture means 118 for adapting the shape of the illumination beam obtained from the sample material and prior its incidence on the optical element 102. The optical characterisation system and the sample holder may be adapted for positioning the sample at a distance from the optical element, the distance being between one time a radius of curvature of the refractive surface and four times a radius of curvature of the refractive surface, i.e.

$$1 \times \rho \leq p \leq 4 \times \rho$$

with $\rho$ being the average radius of curvature of the refractive surface of the optical element. Optimally, the position of the sample may be at a distance from the optical element being the focus distance of the optical element. If an optical element made from glass is used, the latter results in a distance being approximately twice the radius of curvature of the refractive surface of the optical element.

The illumination source 112 typically may be adapted for providing an illumination beam. The illumination beam may e.g. be a light beam. The illumination source 112 may be any suitable illumination source for providing the illumination beam, such as e.g. a laser or a plurality of lasers, a white light source, a filtered white light source, a LED or a number of LEDs, etc. The illumination source 112 may include one or a row of optical probing illumination beams, or a 2D array of optical probing illumination beams. The illumination beam may comprise any of or a plurality of suitable wavelengths for interacting and/or exciting the sample material. Typically, e.g. for spectroscopic measurements, a range of wavelengths may be present in the illumination beam. In other words, the illumination beam may comprise a continuous or quasi-continuous spectrum. The illumination beam may be imaged on the sample material using a beam forming system 114. The beam forming system 114 typically may comprise optical elements. Both the illumination source 112 and the beam forming system 114 may, in case a multi-channel optical characterisation system is envisaged, be common to a plurality or all of the channels of the optical characterisation system.

The sample holder 116 may be any suitable holding means for holding sample material. It may be used in a transmissive or reflective way. Transmissive sample holders typically may be made from transparent material, in order not to substantially absorb the optical signal to be detected. The sample holder may be adapted for holding solid samples or fluid samples. It may e.g. be adapted allowing fluid sample to flow through the measurement cavity, allowing e.g. to measure optical detection signals during the filling of a measurement cavity. Typically the sample holder 116 may be adapted to hold a plurality of sample materials, thus allowing multiplexing, i.e. measuring different samples simultaneously. In the latter case the optical characterisation system typically may be a multi-channel system, as will be described in more detail in one of the embodiments.

Typically the optical characterisation system 100 furthermore may comprise an aperture means 118 for adapting the shape of the illumination beam obtained from the sample material and prior its incidence on the optical element 102. Such an aperture means 118 typically may be an entrance hole or entrance slit. The aperture means 118 may be a physical slit, like an opening in an opaque plate, but can also be the spatially limited volume of a sample under study. The shape and/or width of the entrance slit may be selectable. Preferably, the entrance slit may be positioned at the focus of the refractive surface 108 of the optical element 102, allowing collimating of the illumination beam by the refractive surface 108.

The optical characterisation system furthermore may comprise an evaluation unit, allowing evaluation of the detected optical signals. Such an evaluation unit 120 may comprise a processing means, such as e.g. a microprocessor, and/or a memory component for storing the obtained and/or processed evaluation information. Furthermore typical input/output means may be present. The evaluation unit 120 may be controlled using appropriate software or dedicated hardware processing means for executing the evaluation steps.

The optical characterisation system 100 furthermore may comprise an optical control system 122 for monitoring illumination properties of the illumination of the sample material in the sample holder. Using the optical control system 122 may allow to correct for optical misalignments or influences, e.g. introduced by the sample, an instability of the lamp or a drift of the different components with respect to each other. These illumination properties may comprise a position and/or propagation direction of the beam after passing through the sample material, a focusing distance, a lateral alignment, etc. The monitoring illumination properties may be performed by detecting part of the illumination response signal. The latter may e.g. be obtained by splitting the illumination response signal after passing the sample material and prior to entering the optical component. The optical control signal typically may be detected by an additional detector being part of the optical control system 122. Splitting of part of the illumination response may e.g. be performed by a beam splitter 124. Alternatively or in addition thereto the splitting may also be performed by e.g. a rotating mirror or splitter, deflecting the illumination response signal at regular intervals to the additional detector 126 thus generating an optical control signal. The additional detector 126 may be any suitable detector for evaluating the optical detection signal beam properties. It may e.g. be a single element, a row detector or a 2 dimensional detector, adapted for providing information about the focus, the alignment in one direction or the alignment in two directions. The detector 126 may be adapted for detecting a shape of an optical detection signal beam and the corresponding illumination beam. Monitoring of illumination properties of the illumination may comprise comparing illumination properties of the illumination with a reference value, using a reference measurement, comparing with previously measured results, comparing with look up tables, etc. The obtained information may be used to do post-processing on the data from the detection unit, e.g. in order to improve errors in the measurement results. The present system and method may be used/performed in an automatic or automated way. Monitoring and/or post-processing may be performed using predetermined algorithms. Alternatively, the obtained information may be used for providing feed-back to the optical characterisation device, whereby particular components or the position thereof may be adapted. It thus may be or may be not part of a feed-back system.

In one embodiment, compensation is performed for measurement errors caused by the misalignment between different components of the optical characterisation system 100, resulting in a misalignment e.g. a misalignment between the probing beam and the detector 106, such as a partial overlap due to a lateral misalignment. Alternative misalignment errors that may be at least partially compensated for may be a misalignment between the probing illumination beam and the diffractive element, i.e. whereby light falls next to the diffractive element. It thus can be used to detect lateral misalignments, such as lateral beam misalignments, but for example also to detect oblique incidence of an illumination beam on a sensor surface.

The different aspects of the present invention will now be illustrated by a number of particular embodiments and examples, the invention not being limited thereto.

Figure 2A:
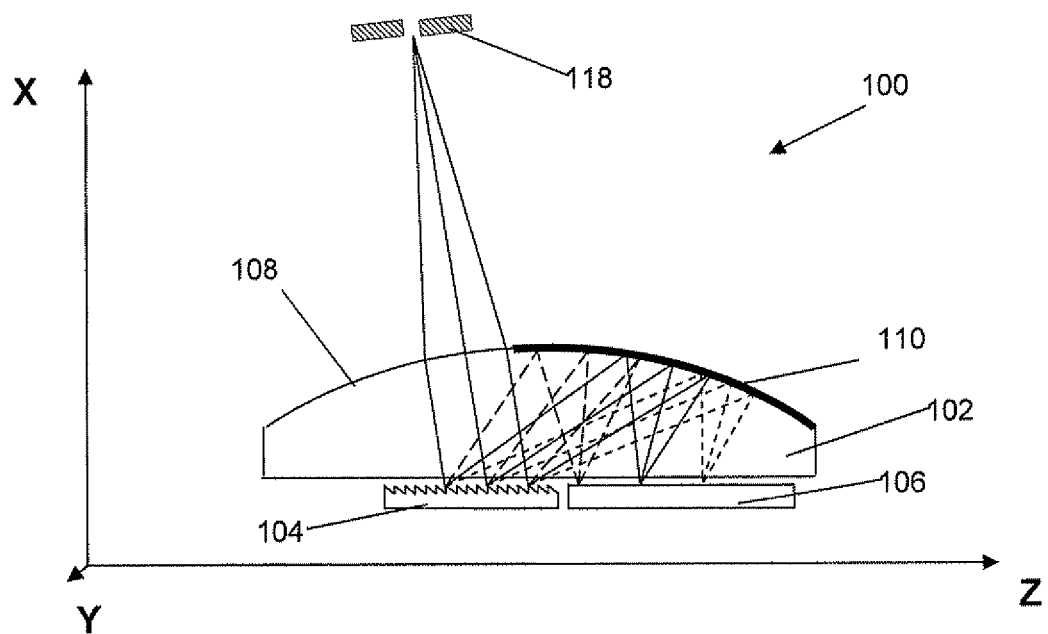
FIG. 2a is an exemplary illustration of an X-Z cross-section of part of an optical characterisation system comprising a grating according to a first embodiment of the first aspect of the present invention.
Figure 2B:
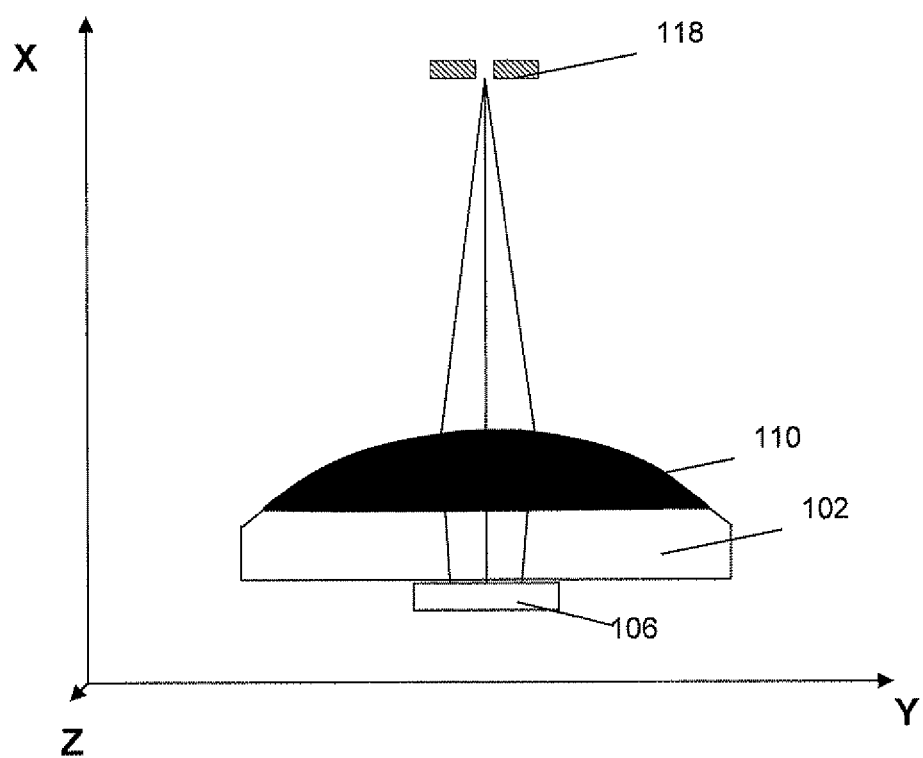
FIG. 2b is an exemplary illustration of an X-Y cross-section of part of an optical characterisation system comprising a grating and a plano-convex spherical optical element according to a first embodiment of the first aspect of the present invention.

In a first embodiment according to the first aspect of the present invention, an optical characterisation system 100 configuration is shown being an exemplary configuration between the diffractive element 104, in the present embodiment being a diffraction grating, the detector 106 and the optical element 102. Such a system 100 is illustrated in X-Z cross section in FIG. 2a, being a cross-section perpendicular to the grooves of the diffraction grating. The optical element 102 of the present embodiment is a plano-convex lens element that is partially coated. Light typically impinges on the uncoated part and is collimated by the curved surface of the optical element 102. Typically, in order to accomplish the collimation, the aperture 118, i.e. entrance slit, of the optical characterisation system typically may be positioned near the focus of the plano-convex lens for the particular direction of incidence of the lens. Such aperture may be implicitly present by the shape and/or size of the sample. The illumination beam is refracted in the optical element 102 by refractive surface 108. Within the optical element 102, the illumination beam propagates towards the diffractive element 104 positioned below the surface of the plano-convex lens. After diffraction of the illumination beam at the diffractive element 104, the illumination beam re-enters in the optical element 102 or proceeds in the optical element 102 and propagates towards the reflective surface 110 of the optical element. This reflective surface acts as a mirror surface and focuses the illumination beam on the detector 106, typically positioned below the flat surface of the plano-convex lens, at the same side of the optical element 102 as the diffractive element 104. In FIG. 2b, an X-Y cross section of an optical characterisation system is shown, parallel to the diffraction grooves, for a system comprising a rotationally symmetric (circular) element 102, the embodiment not being limited thereto. The curvature of the optical element 102 then typically is equal in X-Y and X-Z cross-section influencing some of the position parameters of the components. For a certain angle of the incoming illumination with the optical axis of the optical element 102 and a certain radius of the spherical optical element 102, the desired height of the optical element 102 may be calculated, and the diffractive element 104 and the detector 106 can be optimally positioned. Typically, in order to position the different elements optimally, for a certain angle of incidence of the illumination beam, a certain radius of curvature of the optical element 102 and a certain wavelength range, the point of curvature of the optical element, e.g. the centre point of a sphere of which the lens surface is part if the optical element is a partly spherical lens surface, is moved until the best focussing is achieved on the detector. Typically a two-dimensional sweep of the point of curvature thus may be performed in order to optimise the position of the elements. On the other hand, these distances typically are completely defined by the curvature of the optical element 102 in the XY plane, and thus focusing in this plane using a spherical lens typically may not be perfect due to the difference between the sagittal focal point and the tangential focal point. This small disadvantage is compensated for by the simplicity of the entire optical characterisation system configuration. By using an aspherical optical element 102 with a locally-varying and direction-dependent curvature, this focusing problem can be resolved. Moreover, the non-ideal focusing in the XY plane is not really a problem or disadvantage as the spreading of the illumination beam in this plane should not affect the resolution of the optical characterisation system. A broader detector 106 can simply be used to capture the bundle.

Figure 3:
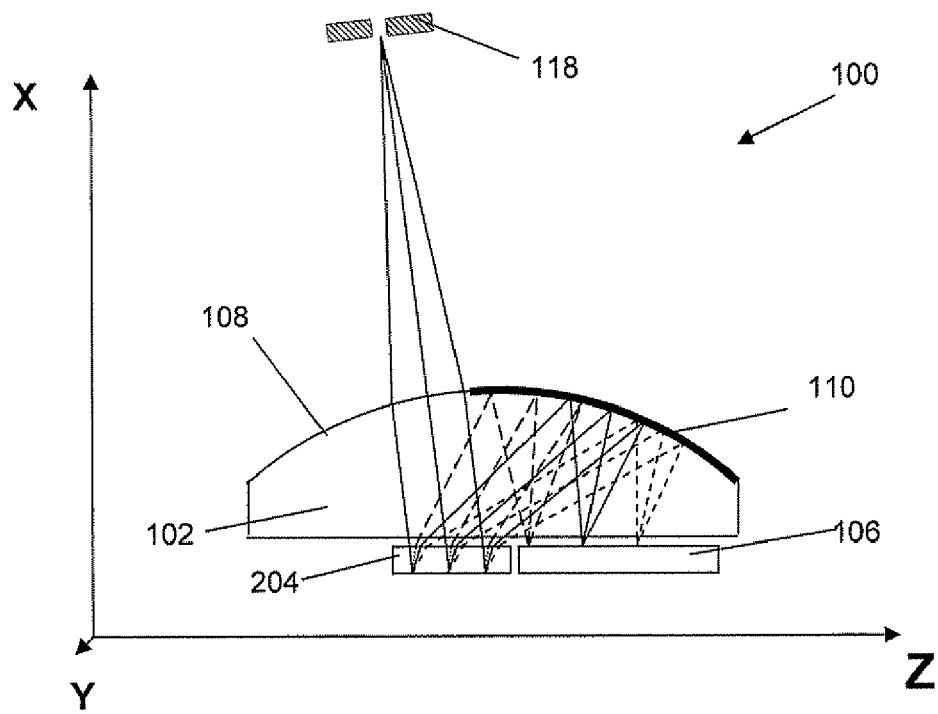
FIG. 3 is an exemplary illustration of an X-Z cross-section of part of an optical characterisation system comprising an immersed grating according to a second embodiment of the first aspect of the present invention.

In a second embodiment according to the first aspect, an optical characterisation system as described above, e.g. according to the first embodiment but not limited thereto, is provided, wherein the diffractive element 104 used is an immersed grating 204. The corrugated side of the grating typically may be directed away from the optical element 102. Typically, in such configuration, illumination has to pass twice through the grating substrate. The flat side of the grating 204 may be brought in optical contact with the optical element 102. The immersed grating 204 may be a transmission grating that is coated with a reflection layer. An X-Z cross-section of an exemplary setup of part of an optical characterisation system 100 according to the second embodiment is shown in FIG. 3.

Figure 4:
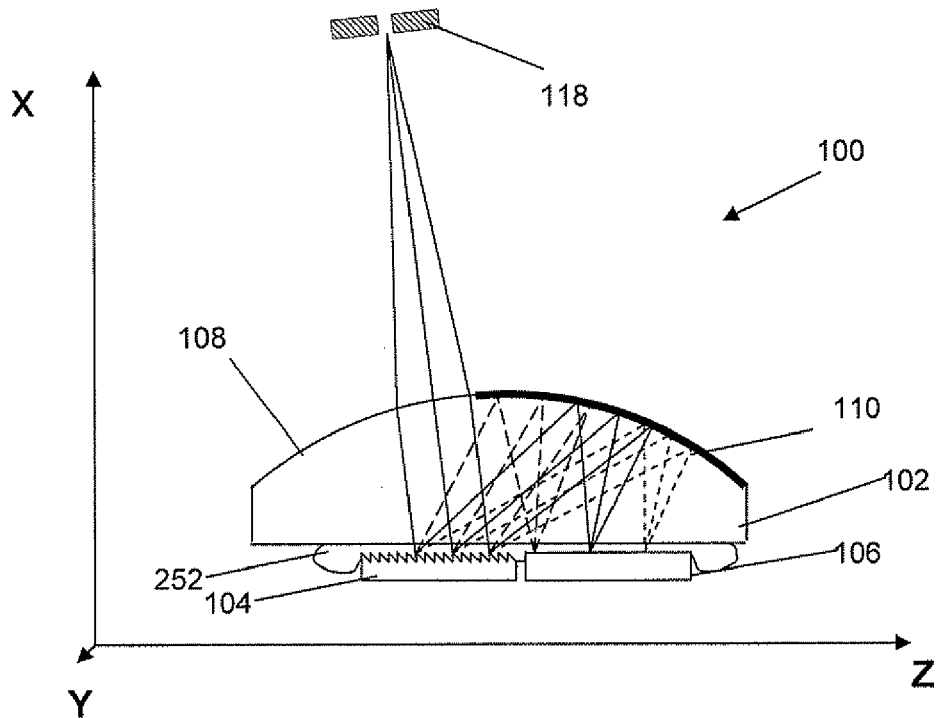
FIG. 4 is an exemplary illustration of an X-Z cross-section of part of an optical characterisation system comprising a diffractive element and/or detector adjacent the optical element, according to a third embodiment of the first aspect of the present invention.

In a third embodiment according to the first aspect, an optical characterisation system as described above, e.g. according to the first and/or second embodiments but not limited thereto, is provided, wherein at least one of the diffractive element 104 or the detector 106 are separate components with respect to the optical element 102, but wherein at least one of the separate components is brought into optical contact with the optical element 102 using an optically transparent adhesive 252. This adhesive 252 may be an epoxy, a glue, a silicone compound, . . . Ideally the adhesive 252 may be index-matching the optical element material but this is not a necessity as for a small refractive index difference parasitic fresnel reflections can be small. An X-Z cross-section of an exemplary part of an optical characterisation system according to the present embodiment is shown in FIG. 4. Alternatively, instead of using an optically transparent adhesive 252, one could also use a non-adhesive transparent liquid in the middle and an adhesive non-transparent adhesive, e.g. glue, at the side of the grating/detector.

Figure 5:
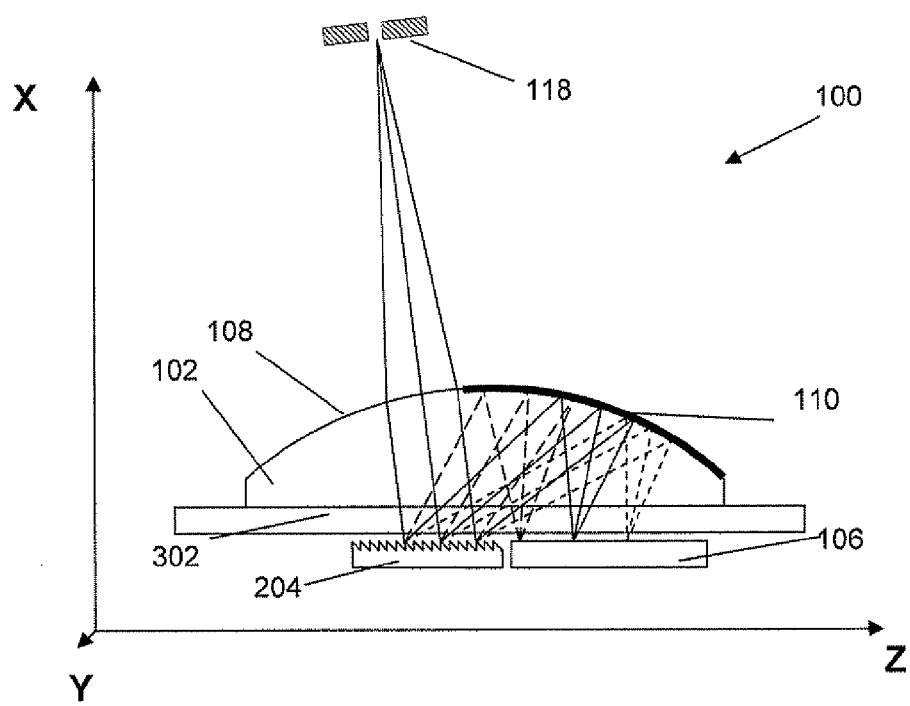
FIG. 5 is an exemplary illustration of an X-Z cross-section of part of an optical characterisation system comprising an additional transparent plate between the optical element and the diffractive element and/or detector, according to a fourth embodiment of the first aspect of the present invention.

In a fourth embodiment according to the first aspect, an optical characterisation system as described above, e.g. according to any of the above embodiments but not limited thereto, is provided, whereby between the optical element 102 and at least one of the diffractive element 104 or the detector 106 an additional optical plate 302 is provided. Such a plate typically may be a transparent plate. It may be made of glass, silica or a polymer such as e.g. plastic. The latter is especially advantageous when a multi-purpose lens is used, as the height of the lens may not be the desired height for guiding the illumination beam. By positioning the additional transparent plate between the optical element 102 and at least one of the diffractive element 104 and the detector 106, advantageous distances between the curved surfaces 108, 110 and the detector 106 and diffractive element 104 can be achieved. Typically optical contact between the various components of the spectrometer may be preferable, as the latter allows reducing or avoiding additional reflections and thus additional losses of light and undesired stray light. Using such a transparent plate may result in the alignment of the different components being essentially a 2-D alignment problem instead of a generally more difficult 3-D alignment problem. With a well-chosen plate thickness only the positions of the grating, the detector and the plano-convex lens in relation to each other are remaining alignments, whereby the distance between the components may be fixed. By positioning everything in close contact with the surface of a plate, the tilting of the components during fabrication and/or use furthermore may be greatly reduced and the alignment may become almost truly 2-D. The same advantage is obtained when the diffractive element 104 and/or detector 106 are positioned directly onto the flat surface of a plano-convex optical element 102. An X-Z cross-section of an exemplary part of an optical characterisation system 100 according to the present embodiment is shown in FIG. 5

Figure 6:
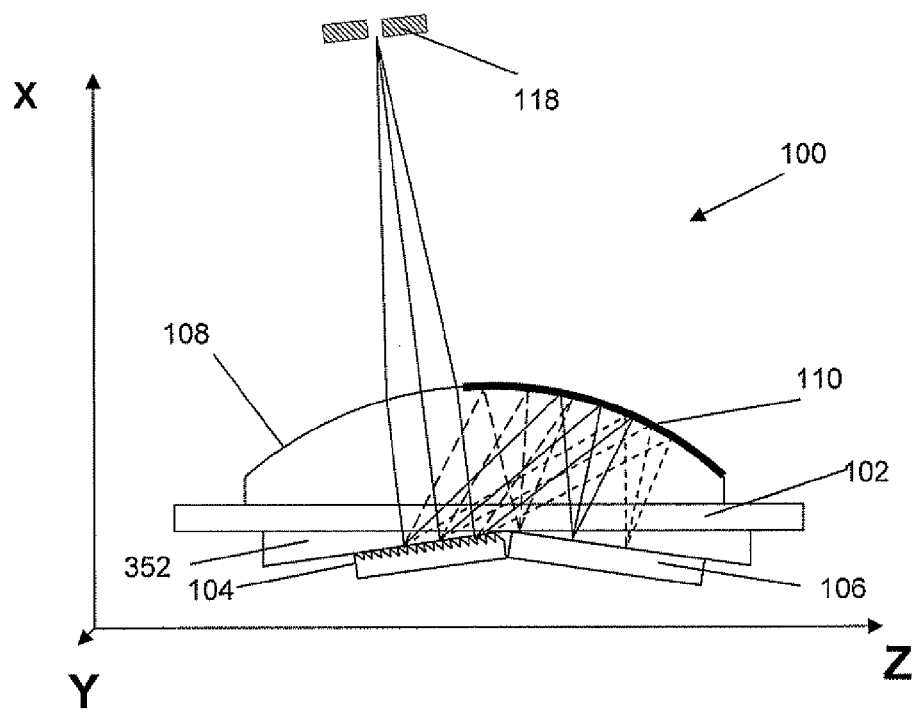
FIG. 6 is an exemplary illustration of an X-Z cross-section of part of an optical characterisation system comprising wedge-shaped plates between the optical element and the diffractive element and/or detector, according to a fifth embodiment of the first aspect of the present invention.

In a fifth embodiment according to the first aspect, an optical characterisation system as described above, e.g. according to any of the above embodiments but not limited thereto, is provided, wherein between the optical element 102 on the one hand and the diffractive element 104 and/or detector 106 on the other hand a wedge-shaped plate 352 is positioned. Such a wedge-shaped plate 352 typically may be a transparent plate. Both for the diffractive element 104 and for the detector 106, a wedge shaped plate may be present. Typically angles may be included between the surface of the plano-convex optical element 102 and the diffractive element 104 or detector 106 within the range 0° to 30°, e.g. between 0° and 20° or between 0° and 10°. More generally, the diffractive element 104 and or the detector 106 may be positioned under an angle with respect to a surface of the optical element. The latter may avoid parasitic reflections from entering back into the system. The angles under which the diffractive element 104 and or the detector 106 may be positioned with respect to the optical element may be within the range 0° to 30°, e.g. between 0° and 20°, e.g. between 0° and 10°. The direction in which such a tilt may be performed may be in any suitable direction with respect to a flat surface of the optical element. The detector 106 and the diffractive element 104 can be slightly rotated, e.g. within the range 0° to 30°, e.g. between 0° and 20° or between 0° and 10° with respect to the normal on their surface to avoid stray light and optimise resolution. The angles of both plates may allow introducing more parameters in the system and thus may lead to better focusing on the detector and a better resolution. The angle as well as the height introduced by the transparent plate(s) may be different between the diffractive element 104 and the detector 106. In some cases the two wedge-shaped plates can be replace by one common wedge shaped plate for the diffractive element 104 and the detector 106. A transparent plate as described in the fourth embodiment and one or more transparent wedge-shaped plates 352 also may be combined into a single plate. Furthermore, the wedge-shaped plate 352, the transparent plate 302 and the optical element 102 also may be combined into one specially-formed optical device. An exemplary part of an optical characterisation system 100 in X-Z cross-section according to the present embodiment is shown in FIG. 6.

Figure 7A:
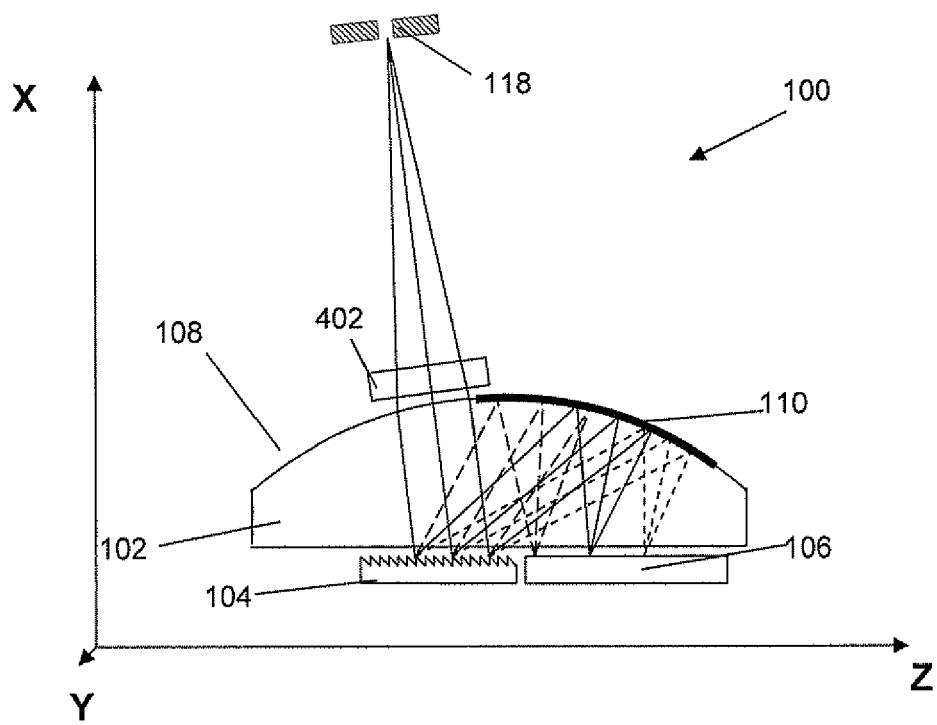
FIG. 7a is an exemplary illustration of an X-Z cross-section of part of an optical characterisation system being a multi-channel optical characterisation system according to a sixth embodiment of the first aspect of the present invention.

In a sixth embodiment according to the first aspect, the present invention relates to an optical characterisation system 100 as described above, e.g. in any of the previous embodiments although not limited thereto, wherein the optical characterisation system 100 is a multi-channel system, i.e. a multi channel optical characterisation system wherein a plurality of samples can be studied in parallel. In other words, the optical characterisation system 100 according to the present embodiment typically allows multiplexing. Such multiplexing may allow to measure a plurality of sample materials at the same time. Typically, the different components will be adapted to facilitate such a multi-channel system. Typically the optical element 102 will be at least partly translational invariant. It may e.g. be a plano-convex cylindrical lens. It may e.g. be at least partly cylindrical. In other words, the cross-section according to X-Z direction, i.e. perpendicular to the grating lines may deviate from a partially circular arc and be aspherical but are the same in every cross-section of the plano-convex lens, e.g. plano-convex cylindrical lens. An exemplary embodiment of such an optical characterisation system is shown in cross-section in FIG. 7a in X-Z cross section. In order to further illustrate the light path of the illumination beam, the light path for an illumination beam of one wavelength is shown by way of example, illustrating how the radiation beam proceeds through the optical component. The radiation beam thereby is collimated to the diffraction element 104 as can be seen by rays 1001, then diffracted to the reflecting element as illustrated by rays 1002, where after it is reflected towards the detector 106 as illustrated by rays 1003. These light rays also are illustrated in FIG. 8.

Figure 7B:
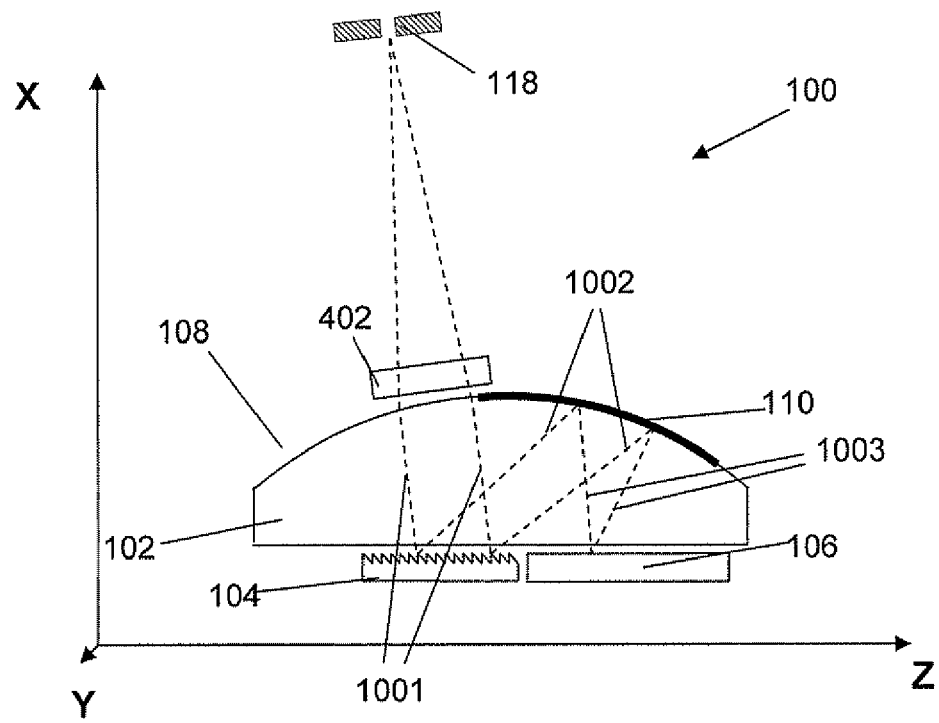
FIG. 7b is an exemplary illustration of an X-Z cross-section as shown in FIG. 7a, whereby the light path for radiation of one wavelength is shown.

An optical element 102 being at least partly translational invariant, i.e. translational invariant in the Y-direction, such as e.g. a plano-convex cylindrical optical element 102 typically does not provide any focusing or collimating in the X-Y plane. Therefore, in the present embodiment, typically a second plano-convex or convex-convex lens 402 is provided for focussing the illumination beam in the channel. Such a second plano-convex lens typically may be a plano-convex cylindrical lens. The second lens 402 may be adapted for focusing the illumination beam in the direction wherein the optical element 102 is at least partly translational invariant. Such a second lens 402 typically may be positioned above the refractive surface 110 of the optical element 102, to provide the focusing or collimating. As the curvature of this second lens 402 lies in the X-Y plane, it is not visible in FIG. 7a or FIG. 7b. FIG. 8 shows the cross-section of such a multi-channel spectrometer in the X-Y plane. The optical element 102 is now looked upon from the non-curved side and with the reflective surface 110 towards the viewer. The detector 106 is positioned in front of the diffractive element 104. In FIG. 8 only the optical element 102 and an underlying transparent plate 302 is shared between the various optical characterisation system channels. For every channel a separate small second lens 402, e.g. a cylindrical lens, a separate diffractive element 104 and separate detector 106, which can be a linear detector array, are shown.

Figure 8:
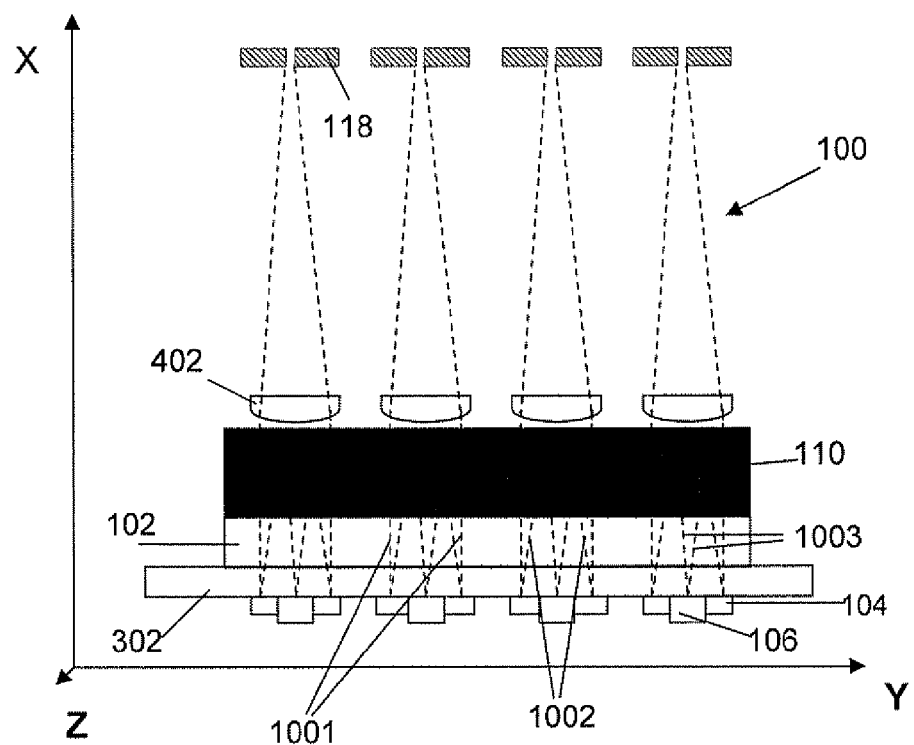
FIG. 8 is an exemplary illustration of an X-Y cross-section of part of an optical characterisation system being a multi-channel optical characterisation system according to a sixth embodiment of the first aspect of the present invention.
Figure 9:
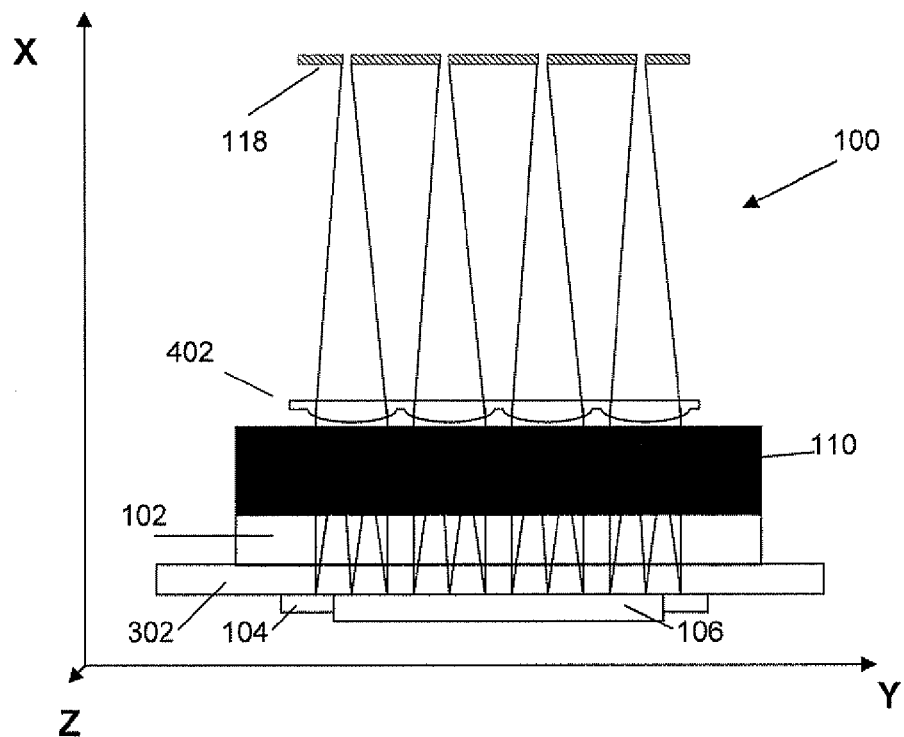
FIG. 9 is an exemplary illustration of an X-Y cross-section of an alternative part of an optical characterisation system being a multi-channel optical characterisation system according to a sixth embodiment of the first aspect of the present invention.

FIG. 9 shows an X-Y cross section of a similar configuration as FIG. 8 wherein more components are shared between the various channels. E.g. the diffractive element 104 may be shared between a plurality or all channels of the optical characterisation system 100 or the detector 106 may be shared between a plurality or all channels of the optical characterisation system 100. The detector 106 in this case may be a 2-D detecting array. The second lenses 402 also may be produced as a single component. Combining multiple components decreases the numbers of alignments that need to be taken care of during the assembly of the optical characterisation system, thus generally resulting in a more accurate system or in a smaller manufacturing or alignment effort. Between the embodiments shown in FIG. 8 and FIG. 9 various resembling embodiments are possible by sharing more or less components. In the embodiment shown in FIG. 9, the number of possible alignments between the various components becomes very small and independent of the number of channels Furthermore, the optical characterisation system 100 also may share the illumination source and beam forming system for different channels in the optical characterisation system 100. The system thus may be a compact multiplexing optical characterisation system.

In a second aspect, the present invention relates to a method for optically characterising material. Optically characterising may be determining luminescence or fluorescence or Raman responses from the material, determining an absorption characteristic of the material, etc. Typically, the method comprises illuminating a material with an illumination beam, allowing interaction of the illumination beam with the material. The resulting illumination response, which may be an attenuated illumination beam or a luminescence illumination beam resulting from excitation with the original illumination beam, typically may be captured in an optical element. The method further comprises refracting the illumination response into a collimated illumination response incident on a diffractive element where the illumination response is diffracted. The method also comprises reflecting the diffracted illumination response towards a detector and detecting the reflected illumination beam at the same side of the optical component as the diffracting of the illumination response. The method is especially suitable for being performed using an optical characterisation system as described in the first aspect of the present invention. The method furthermore may comprise evaluating the detected illumination response and providing a suitable output to a user. The method may be performed in an automated and/or automatic way.

In a third aspect, the present invention relates to the optical element 102 adapted for assisting in optical characterisation of materials. The optical element 102 typically is adapted for receiving an illumination beam, which typically may be an illumination response from a material to be characterised. The optical element furthermore is adapted for being used with a diffractive element and a detector whereby the optical element has a refractive surface for refractively collimating the illumination beam on a diffractive element and the optical element having a reflective surface for reflecting the diffracted illumination beam on a detector. Typically the optical element is adapted for cooperating with a diffractive element and detector positioned at a same side of the optical element The optical element also may be adapted for receiving the illumination beam at the opposite side from the side the diffractive element and detector element are positioned. The latter may be obtained by a reflective surface of the optical element being at the same side as the refractive surface of the optical element. The optical element typically thus may be a catadioptric element. The reflective surface may be obtained by partially coating a curved surface of the optical element. The number of reflections occurring in the optical element may be two or smaller. Other features and advantages of the present optical element are described in more detail for the optical element 102 of the optical characterisation system as described in the first aspect and thus are also applicable for the optical element of the present aspect of the present invention.

Figure 10:
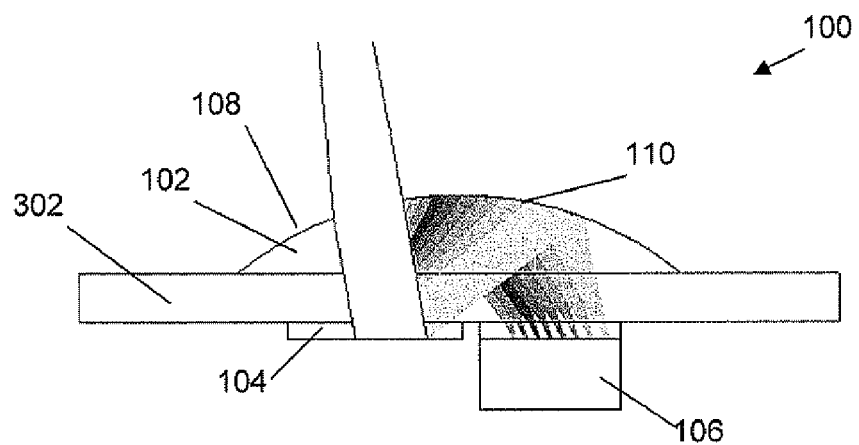
FIG. 10 is an exemplary illustration of a simulation result for an incident light beam in an optical characterisation system as described in the first aspect of the present invention.

By way of illustration, a numerical example is shown further illustrating the features and advantages according to embodiments of aspects of the present invention. The optical element 102 in the present example is made from silica. The results for a simulation of an incoming illumination beam having a wavelength between 220 nm and 720 nm is shown in FIG. 10. The simulation typically is performed using a ray tracing simulation. The entrance slit of the optical characterisation system is not shown but can be inferred from the form of the incoming multichromatic bundle. The illumination beam is incident on the optical element 102, i.e. on a refractive surface 108 of the optical element 102. The illumination beam is guided through an additional silica plate on a grating 104, where it is diffracted into different monochromatic colours. The grating of the present example comprises 600 grooves/mm. The different sub-beams having a different colour then are reflected by a reflective surface 110 towards a detector 106. The grating in the present example is used as an immersed grating and the detector lies a small distance below the additional transparent plate, with the intermediate distance filled up with a substance that has a refractive index similar to that of the lens. In the present example, the angle of incidence of the illumination beam with respect to normal of the flat surface of the plano-convex optical element 102 is 9°. The centre point of the diffractive element 104 is located at a distance 0.05 times the radius in horizontal direction from the centre of curvature of the spherical lens surface. The plane surface of the plano-convex spherical lens is positioned at 0.52 times the radius from the centre of curvature of the spherical lens surface in vertical direction, above the centre of curvature. This simulation illustrates some of the principles according to embodiments of the present invention. For reasons of clarity, in the present example, not a continuous spectrum is used in the illumination beam but a source consisting of 8 different monochromatic wavelengths. Thus the focussing of the various wavelengths on the detector can be better visualised. In the continuous case, a continuous focussing instead of 8 separate images will be formed on the detector.

Other arrangements for accomplishing the objectives of the optical elements and optical characterisation systems and methods embodying the invention will be obvious for those skilled in the art.

It is to be understood that although preferred embodiments, specific constructions and configurations, as well as materials, have been discussed herein for devices according to the present invention, various changes or modifications in form and detail may be made without departing from the scope and spirit of this invention. For example, whereas aspects and embodiments are related to a device and system for optically characterising material, the present invention in a further aspect also relates to a method for designing an optical characterisation system. The optical characterisation system typically comprises an optical element 102 having a refractive surface for refractively collimating an illumination beam and a reflective surface for reflectively focussing a diffracted illumination beam. The optical characterisation system furthermore typically comprises a diffractive element 104 and a detector 106, positioned at a same side of the optical element 102. Typically, such a method for designing is a computer based method comprising receiving parameters about the optical element 102 and the diffractive element 104. The method furthermore typically comprises for at least one position of the optical element 102 with respect to the diffractive element 104, determining a position of a focus curve 606 (indicated by way of example in FIG. 13) for an illumination beam focused by the optical element 102. The focus curve 606 typically is the curve comprising all focus points for every wavelength in the wavelength range. The method also comprises evaluating said position of said focus curve 606 with respect to a position of a detector surface of the detector element 106, positioned at a same side of the optical element 102 as the diffractive element 104.

Receiving parameters about the optical element 102 and the diffractive element 104 typically may comprise receiving a selected radius of curvature R for the optical element, an angle of incidence $\theta_{in}$ of the light impinging on the diffractive element and a period of the diffractive element. The radius of curvature R of the optical element 102 typically may be limited to the available off-the-shelf components, although the invention is not limited thereto and optical elements also could be manufactured on request, and by the final size of the envisioned spectrometric system. The larger the radius R, the larger the final size of the system but the better the resolution will be for a certain input slit width. The radius of curvature may for the purpose of designing be the average radius of curvature, e.g. if the curved surface of the optical element is not part of a sphere. Alternatively, in more complicated cases, the different radii of curvature may be taking into account, e.g. by putting in full surface shape information. The period of the diffractive element also may be limited by the choice of off-the-shelf components but depending on the aimed wavelength range lies between 600 and 2400 grooves per mm, corresponding to periods of between respectively 1.67 μm and 0.4167 μm. The angle $\theta_i$ that the illumination beam will make with the normal on the diffractive element when impinging on this diffractive element will determine the f-number of the spectrometer. Typical values may be between −10 degrees and 30 degrees.

Determining a position of a focus curve 606 for an illumination beam focused by the optical element 102 for at least one relative position of the optical element 102 with respect to the diffractive element 104 may be performed using optical modelling software. Determining a position of a focus curve 606 may comprise positioning the optical element 102, and thus its point of curvature 604, with respect to the diffractive element 104, in FIG. 11 positioned at 602. Depending on the exact shape of the curved surface of the optical element 102, a number of points of curvature may be present. In the latter case, an average point of curvature may be used or all points of curvature may be taken into account. For determining a position of a focus curve 606 for an illumination beam focused by the optical element 102, typically following light path may be taken into account. Typically the light coming from an entrance slit and falling onto the optical element 102 may be refractively collimated and may fall onto the diffractive element 104. The latter is indicated in FIG. 12, indicating the angle of the illumination beam incident on the diffractive element 102 with respect to the normal of the diffractive element surface, here referred to as $\theta_{in}$. The angle of the diffracted illumination beam is calculated using the grating equation, given by $$\lambda = nd(\sin\theta_{in} - \sin\theta_{out})$$

or $$\theta_{out} = a\sin\left(\frac{\lambda}{nd} - \sin\theta_{in}\right)$$

with λ the wavelength of the light beam, n the refractive index of the optical element and d the period of the diffractive element. After diffraction, the still collimated light beam typically may be reflected off the curved surface of the optical element and may be focused. Such a reflection typically may be specular meaning that the input and output angle of the light with the normal on the local surface are identical, as indicated on FIG. 12. The focusing of the light beam typically may appear on a distance f from the curved surface determined by the radius of curvature R and the angle between the light beam and the local normal on the surface, called $\theta_m$.

$$f = \frac{R \cdot \cos\theta_m}{2}$$

Figure 13:
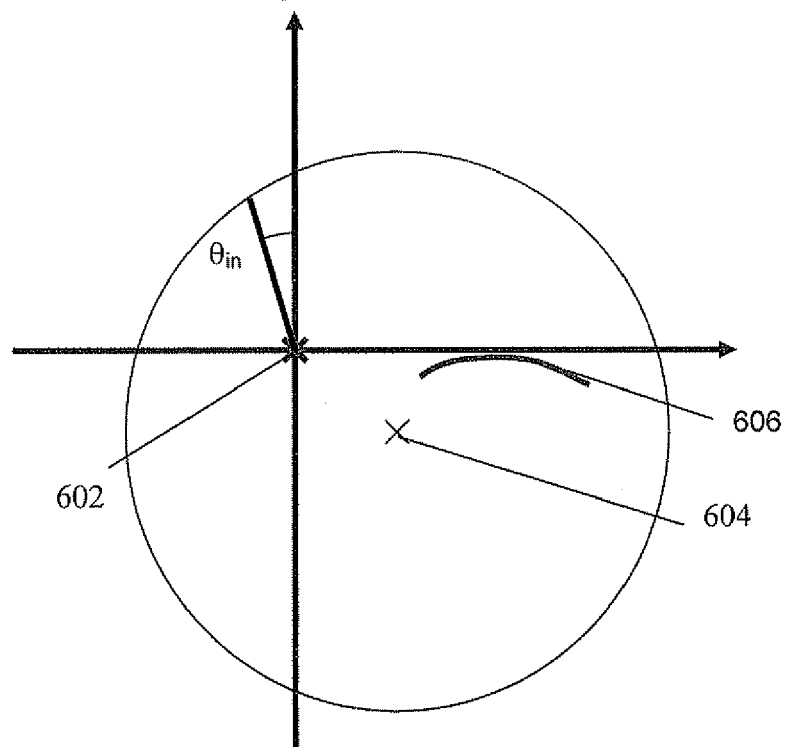
FIG. 13 is a schematic representation of a determined focus curve, as determined in a method for designing according to a further aspect of the present invention.

For every wavelength in the wavelength range, the diffraction direction and the resulting focus point are different. All the focus points for every wavelength in the wavelength range form a curve called the focus curve 606 or the focal loci. An example of a focus curve 606 is shown in FIG. 13.

Evaluating said position of said focus curve with respect to a position of a detector surface of the detector 106, positioned at a same side of the optical element 102 as the diffractive element 104, typically may comprise comparing the position of the focus curve 606 with respect to a suitable position of the detector surface of the detector 106. The latter may be performed by comparing the obtained result with predetermined evaluation criteria such as e.g. a minimum in difference in position of the focus curve and a possible, suitable or preferred detector surface position, by comparing the obtained results with previously obtained results and selecting the result with the smallest position difference, etc.

Figure 14:
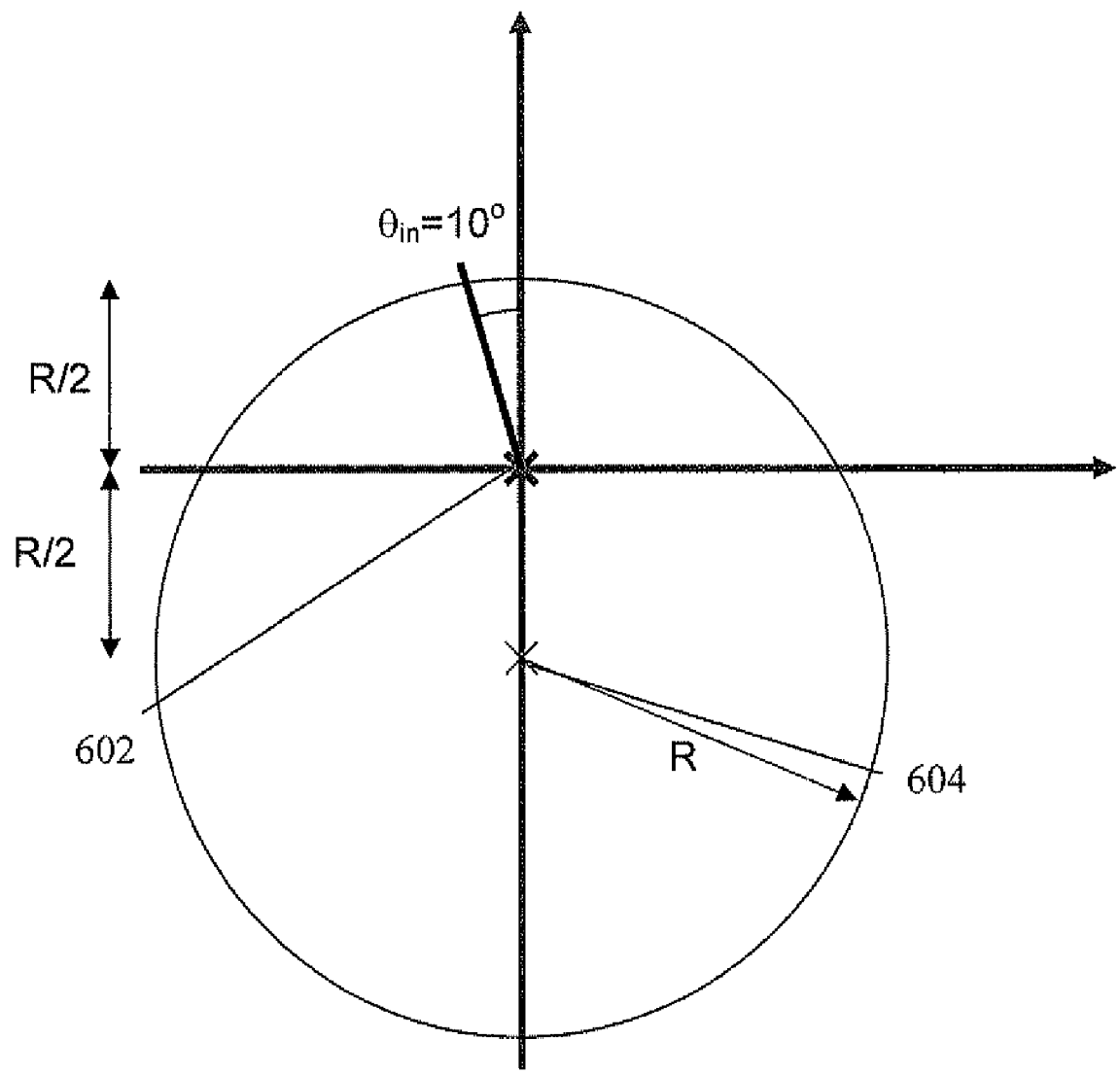
FIG. 14 is a schematic representation of possible initial positional conditions for determining a focus curve, as can be used in the method for designing according to a further aspect of the present invention.

Selecting an appropriate relative position of the optical element and the diffractive element may be performed at random, or according to a predetermined algorithm. A good starting point for this optimisation may be the position shown in FIG. 14.

Typically determining and evaluating the focus curve 606 may be performed for a number of relative positions of the optical element with respect to the diffractive element 104. By sweeping the position of the optical element, and thus of the point of curvature, the position and the form of the focus curve changes and a good or optimum position can be determined. The evaluation criterion may be that the focus position overlaps at least 20%, preferably at least 40%, more preferably at least 60% with the preferred detector position. The latter may be in the plane determined by one side of the optical component, the plane determined by the diffractive element, etc. In the ideal case, the focus curve will be flat and will coincide with the optical element surface and be as wide as the available detector.

Typically the method may be performed in an automatic and/or automated way. It may be performed using predetermined algorithms or e.g. neural networks. The determining of the focus curve position may be performed using optical modelling software such as such as Zemax® available from Zemax Development Corporation, LightTools® available from Optical Research Associates, TracePro® available from Lambda Research Corporation or Advanced Systems Analysis Program ASAP™ available from Breault Research Organisation or using any other suitable software allowing to determine, e.g. by simulation, the position of the focus curve 606.

Figure 11:
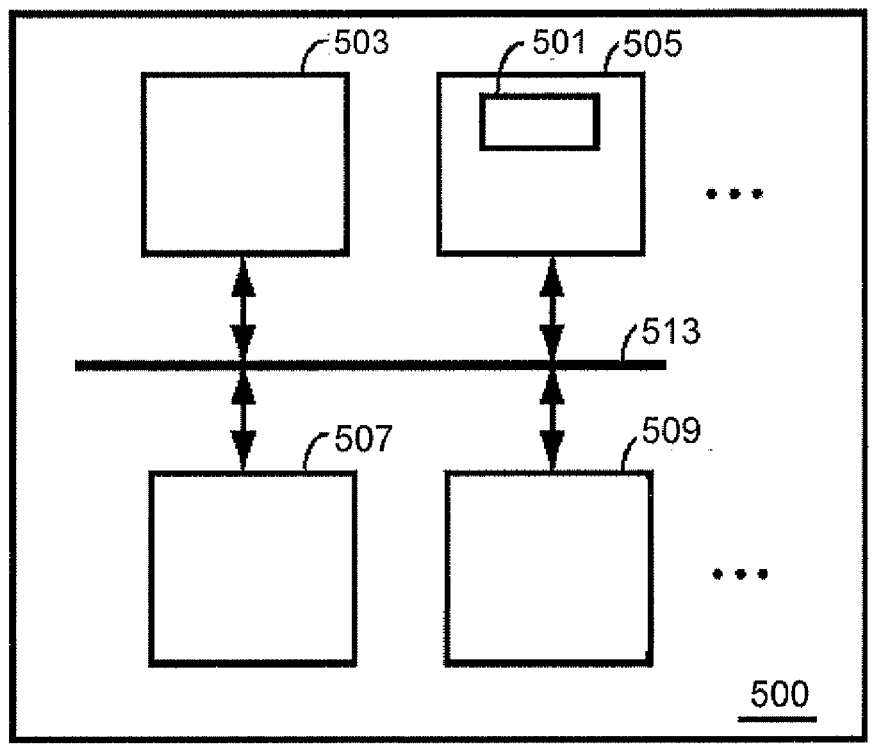
FIG. 11 is an exemplary illustration of a computing system as may be used for performing a method for designing according to a further aspect of the present invention.
Figure 12:
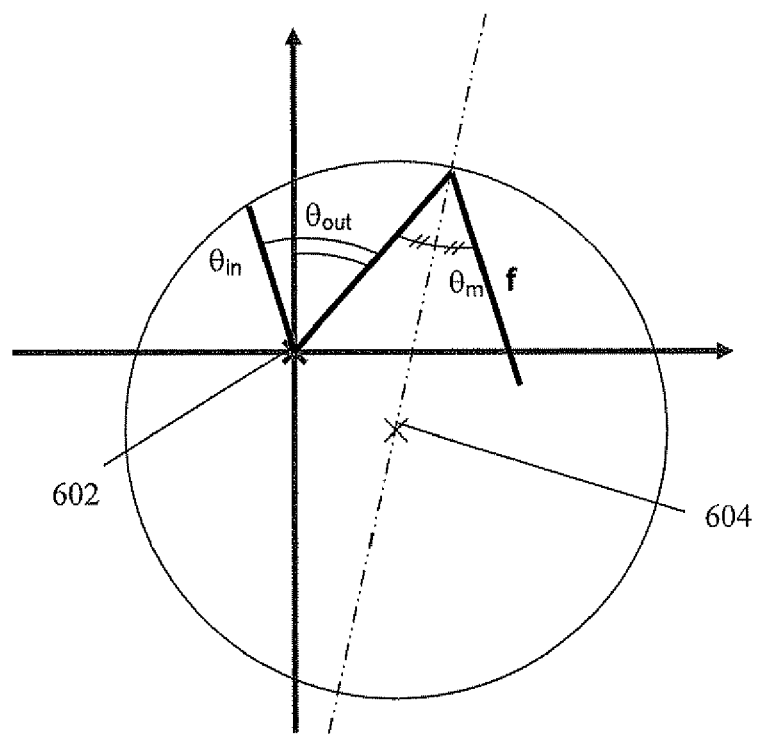
FIG. 12 is a schematic representation of the different angles between a refracted illumination beam, a diffracted illumination beam and a reflected illumination beam as can be used in the method for designing according to a further aspect of the present invention.

The above-described designing method may be implemented in a processing system 500 such as shown in FIG. 11. FIG. 11 shows one configuration of processing system 500 that includes at least one programmable processor 503 coupled to a memory subsystem 505 that includes at least one form of memory, e.g., RAM, ROM, and so forth. It is to be noted that the processor 503 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system may include a storage subsystem 507 that has at least one disk drive and/or CD-ROM drive and/or DVD drive. In some implementations, a display system, a keyboard, and a pointing device may be included as part of a user interface subsystem 509 to provide for a user to manually input information. Ports for inputting and outputting data also may be included. More elements such as network connections, interfaces to various devices, and so forth, may be included, but are not illustrated in FIG. 11. The various elements of the processing system 500 may be coupled in various ways, including via a bus subsystem 513 shown in FIG. 11 for simplicity as a single bus, but will be understood to those in the art to include a system of at least one bus. The memory of the memory subsystem 505 may at some time hold part or all (in either case shown as 511) of a set of instructions that when executed on the processing system 500 implement the steps of the method embodiments described herein. Thus, while a processing system 500 such as shown in FIG. 11 is prior art, a system that includes the instructions to implement aspects of the designing methods for designing optical characterisation systems are not prior art, and therefore FIG. 11 is not labelled as prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

The invention claimed is:

1. An optical element adapted for receiving at a first side an illumination beam and adapted for being used with a diffractive element and a detector, the optical element at the first side having a refractive surface adapted for refractively collimating the received illumination beam on a diffractive element and the optical element having a reflective surface adapted for reflecting the collimated diffracted illumination beam, diffracted by the diffractive element, on a detector, said optical element being adapted for the diffractive element and the detector to be positioned at a same side of the optical element, opposite to said first side, wherein said refractive surface and said reflective surface are positioned at a same side of the optical element and are part of a same convex cylindrical surface of the optical element.

2. An optical element according to claim 1, wherein the optical element comprises a partially coated lens element, the coating being reflective.

3. An optical element according to claim 1, wherein the optical element comprises a plano-convex cylindrical element.

4. An optical element according to claim 1, wherein the optical element has any of a diffractive element or detector formed on a surface.

5. An optical element according to claim 1, wherein the optical element is at least partially translationally invariant in a first direction.

6. An optical characterisation system for characterising material, the system comprising a diffractive element, a detector and an optical element according to claim 1.

7. An optical characterisation system according to claim 6, wherein the optical element is at least partially translationally invariant in a first direction, the optical characterisation system being a multi-channel system furthermore comprising, for each channel, a second lens arranged to focus or collimate the illumination beam in the channel in the first direction.

8. An optical characterisation system according to claim 7, wherein the second lens comprises a plano-convex lens.

9. An optical characterisation system according to claim 7, wherein the second lens is any of a convex-convex, a cylindrical or a plano-convex cylindrical lens.

10. An optical characterisation system according to claim 6, wherein the diffractive element and the detector are in contact with the optical component.

11. An optical characterisation system according to claim 6, the optical characterisation system being a multi-channel optical characterisation system configured to characterise a plurality of samples in parallel.

12. An optical characterisation system according to claim 6, wherein the diffractive element of the optical characterisation system is a diffractive element common to different channels of the optical characterisation system.

13. An optical characterisation system according to claim 6, the optical characterisation system comprising a sample holder for positioning the sample at a distance from the optical element, the distance being between one time a radius of curvature of the refractive surface and four times a radius of curvature of the refractive surface.

14. A method for optically characterising a material, the method comprising:
illuminating a material with an illumination beam thus generating an illumination response;
thereafter,
receiving the illumination response from the sample on an optical element at a first side;
refracting on the first side of the optical element the illumination response from the sample into a collimated illumination response at an optical element;
diffracting the collimated illumination response thus generating a diffracted illumination response;
reflecting, at the optical element, the diffracted illumination response thus generating a reflected illumination response; and
detecting said reflected illumination response at a same side of the optical element as said diffracting of the illumination response, opposite to the first side of the optical element;
wherein said refracting and reflecting is performed at a same side of the optical element using parts of a same convex cylindrical surface.

* * * * *